(12) United States Patent
Kaddatz

(10) Patent No.: US 7,200,914 B2
(45) Date of Patent: Apr. 10, 2007

(54) APPARATUS AND METHOD FOR LOADING A RIVETING MODULE WITH BLIND RIVET NUTS

(75) Inventor: Uwe Kaddatz, Burgdorf (DE)

(73) Assignee: Avdel Verbindungselemente GmbH (DE)

( * ) Notice: Subject to any disclaimer, the term of this patent is extended or adjusted under 35 U.S.C. 154(b) by 168 days.

(21) Appl. No.: 10/432,279

(22) PCT Filed: Aug. 2, 2001

(86) PCT No.: PCT/DE01/02933

§ 371 (c)(1),
(2), (4) Date: Oct. 28, 2003

(87) PCT Pub. No.: WO02/11943

PCT Pub. Date: Feb. 14, 2002

(65) Prior Publication Data

US 2004/0060957 A1 Apr. 1, 2004

(30) Foreign Application Priority Data

Aug. 4, 2000 (DE) .................. 200 13 585

(51) Int. Cl.
*B21J 15/02* (2006.01)
*B23Q 7/10* (2006.01)
(52) U.S. Cl. .............. 29/525.06; 29/818; 29/812.5; 29/243.53; 29/788; 29/816; 227/139; 227/140
(58) Field of Classification Search ............... 29/243.5, 29/243.53, 809, 813, 524.1, 525.01, 798, 29/787, 788, 812.5, 818, 816, 525.05, 525.06; 227/139, 140
See application file for complete search history.

(56) References Cited

U.S. PATENT DOCUMENTS

| | | | | |
|---|---|---|---|---|
| 3,557,442 A * | 1/1971 | Speller | .................... | 29/525.06 |
| 3,657,915 A * | 4/1972 | Lee | ........................... | 29/812.5 |
| 3,750,257 A * | 8/1973 | Berecz | ........................ | 29/813 |
| 4,044,462 A * | 8/1977 | Anselmo | ...................... | 29/809 |
| 4,059,981 A * | 11/1977 | Holloway | .................. | 29/812.5 |
| 4,205,547 A * | 6/1980 | Yamasaka | .................. | 29/812.5 |
| 4,463,889 A * | 8/1984 | Sartran | ........................ | 227/112 |
| 4,586,362 A * | 5/1986 | Dean et al. | ................. | 29/812.5 |
| 4,604,889 A * | 8/1986 | Sukharevsky | .............. | 29/812.5 |
| 4,747,294 A * | 5/1988 | Schwartz et al. | .......... | 29/812.5 |
| 4,785,529 A * | 11/1988 | Pamer et al. | ................. | 29/707 |
| 5,226,228 A * | 7/1993 | Aoyama | .................... | 29/33 K |

(Continued)

FOREIGN PATENT DOCUMENTS

DE 3825675 2/1990

(Continued)

*Primary Examiner*—Essama Omgba
(74) *Attorney, Agent, or Firm*—Trexler, Bushnell, Giangiorgi, Blackstone & Marr, Ltd.

(57) ABSTRACT

The invention relates to a device for loading a rivet module (10), which can be vertically displaced between a lower placement position and an upper loading position, with blind rivet nuts (100) using a rivet feed (22). The invention is characterized in that next to the rivet placement head (12), a cup (24) for accommodating blind rivet nuts is laterally arranged such that it can be displaced between a position underneath the rivet feed (22) and a position underneath the rivet module (10) that is located in the loading position, whereby the cup (24) is provided with a clamping cylinder.

8 Claims, 3 Drawing Sheets

U.S. PATENT DOCUMENTS

| | | | | |
|---|---|---|---|---|
| 5,291,645 | A | * | 3/1994 | Aoyama ................ 29/407.02 |
| 5,295,295 | A | * | 3/1994 | Aoyama .................... 29/813 |
| 5,400,942 | A | | 3/1995 | Gast et al. |
| 5,588,554 | A | * | 12/1996 | Jones ......................... 221/88 |
| 5,640,758 | A | * | 6/1997 | Roessler et al. ........... 29/812.5 |
| 5,813,114 | A | * | 9/1998 | Blacket et al. ............... 29/809 |
| 5,964,393 | A | * | 10/1999 | Feldpausch et al. ........ 227/135 |
| 5,974,660 | A | * | 11/1999 | Muller ....................... 29/823 |
| 6,692,213 | B1 | * | 2/2004 | Butler ........................ 414/412 |
| 6,854,178 | B2 | * | 2/2005 | Fritsche et al. .............. 29/813 |
| 6,941,627 | B2 | * | 9/2005 | Fritsche et al. .......... 29/243.53 |
| 6,944,944 | B1 | * | 9/2005 | Craythorn et al. ............ 29/798 |
| 2005/0055816 | A1 | * | 3/2005 | Sloger ................... 29/243.251 |

FOREIGN PATENT DOCUMENTS

| | | | |
|---|---|---|---|
| DE | 9201359 | | 7/1992 |
| DE | 4423165 | | 1/1998 |
| DE | 19842103 | | 3/2000 |
| DE | 10208865 | A1 * | 9/2003 |
| JP | 05154725 | A * | 6/1993 |

* cited by examiner

APPARATUS AND METHOD FOR LOADING A RIVETING MODULE WITH BLIND RIVET NUTS

RELATED/PRIORITY APPLICATIONS

This application claims priority with respect to International Application No. PCT/DE01/02933, filed Aug. 2, 2001, and German Application No. 20013585.6, filed Aug. 4, 2000.

BACKGROUND OF THE INVENTION

The present invention relates to an apparatus and a method for loading a riveting module, which is vertically displaceable between a lower placing position and an upper loading position, with blind rivet nuts using a rivet feed.

The feeding of blind rivet nuts and especially the loading of a riveting module with such blind rivet nuts still is problematical. The corresponding devices are rather complex and followingly rather cumber-some to maintain and produce or are not working sufficiently reliably.

BRIEF SUMMARY OF THE INVENTION

It is followingly a task to be solved by the present invention to improve such an apparatus for loading a riveting module with blind rivet nuts in such a way that the construction is drastically simplified and can be used in any deliberate position, wherein simultaneously a high working reliability is achieved and further to provide a suitable method for loading a riveting module with blind rivet nuts.

According to the invention, the above task is solved in an apparatus for loading a riveting module with blind rivet nuts of the above species by the features that next to the rivet placing head a cup for receiving blind rivet nuts is provided being laterally movable between a position below the rivet feed and a position below the riveting module positioned in the loading position, wherein the cup is having a clamping cylinder.

In this connection, it is preferred that the rivet feed is designed as a long, straight, vertically extending tube. In this way, the feed of the rivet nuts is further accelerated.

Further, it is especially preferred that all motive means are pneumatic cylinders. In this way, the costs for obtaining the parts and for the operation can be further minimized.

Additionally it is preferred that the cup is mounted by only two screws on a slide driven by a pneumatic cylinder. In this way, the apparatus quickly and easily can be reset to the use of blind rivet nuts having a different diameter.

Further, positive grip blind nuts can be used if these by suitable abutment pieces on the clamping cylinder are suitably oriented and thereby are fed to the riveting module in the correct position.

BRIEF DESCRIPTION OF THE DRAWINGS

In the following, an exemplary embodiment of the present invention is more detailly described with reference to the enclosed drawings. In the drawings show.

DETAILED DESCRIPTION OF THE INVENTION

Figure 1:
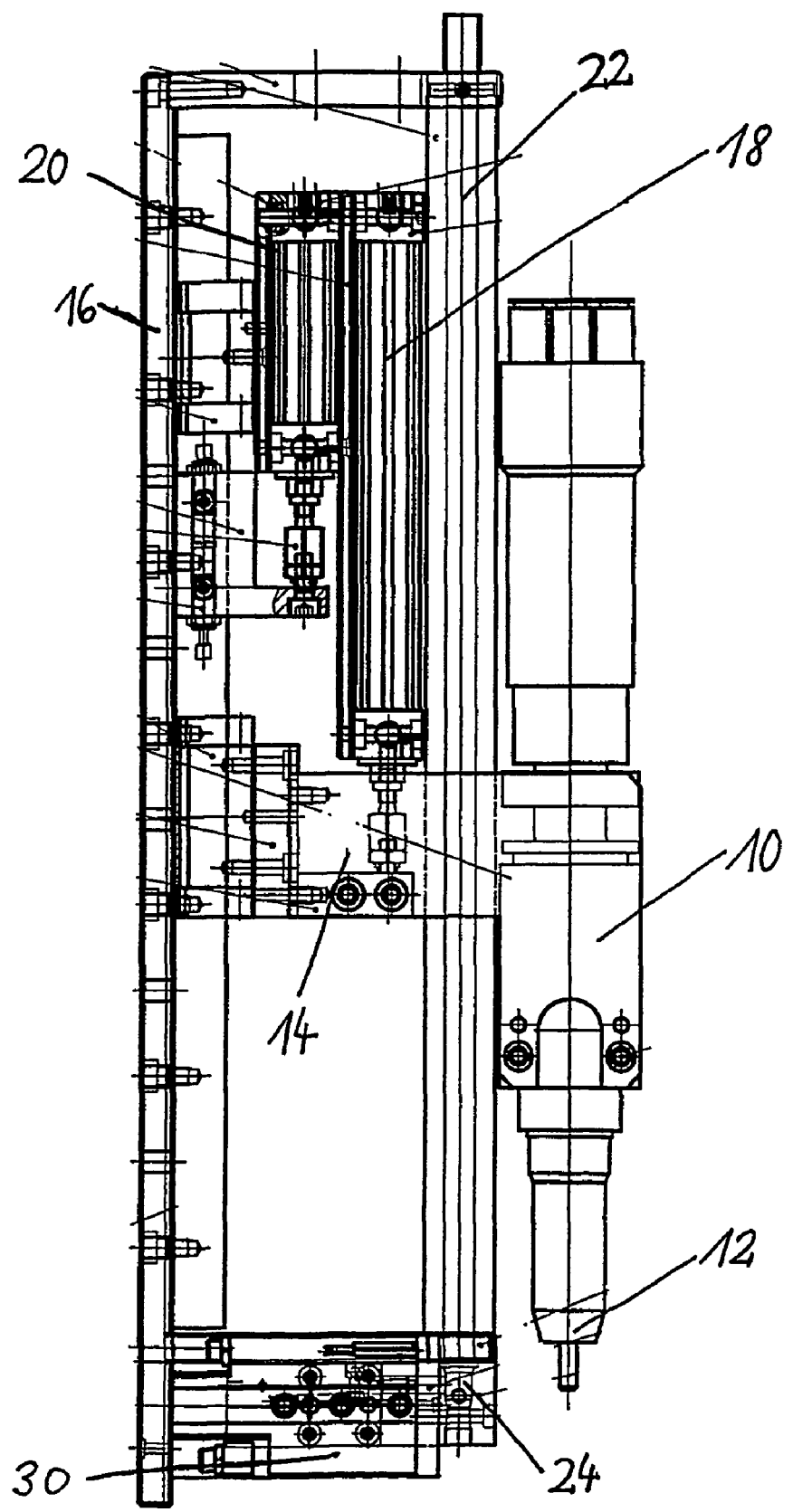
FIG. 1 a sectional front view of the apparatus according to the invention in the basic position.
Figure 2:
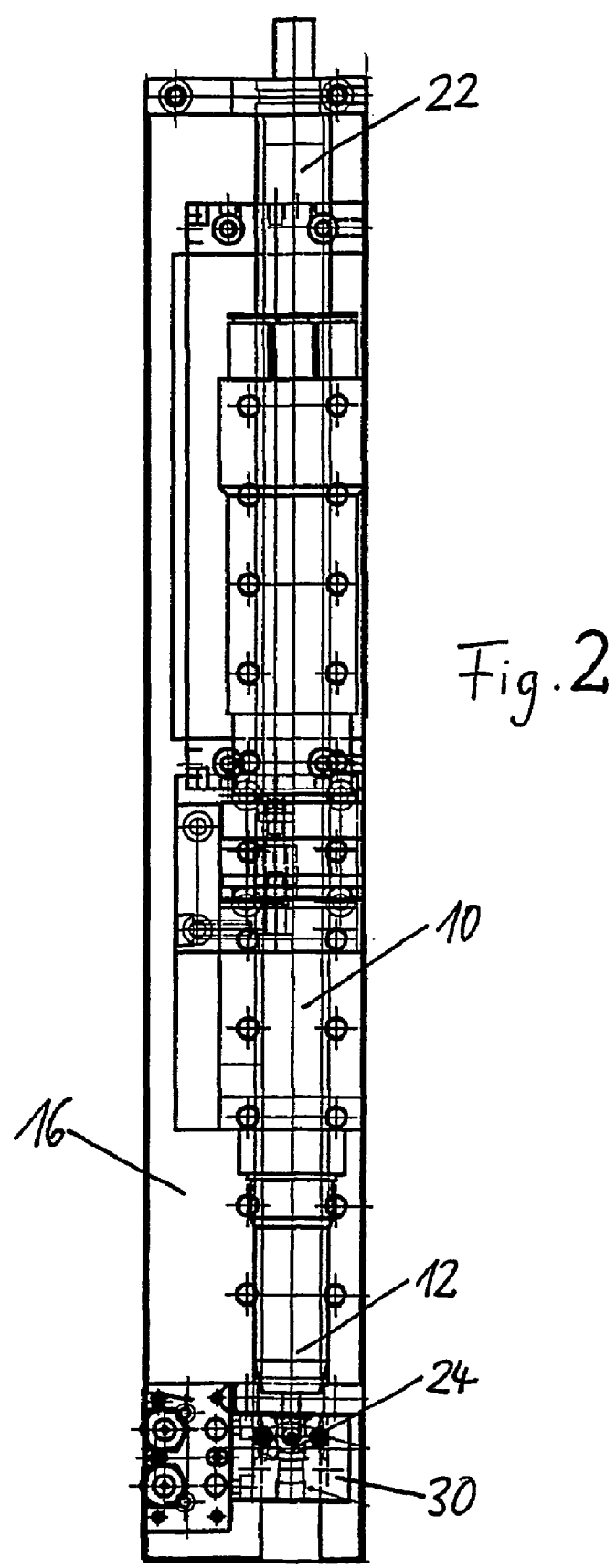
FIG. 2 a side view of FIG. 1 in the basic position.
Figure 3:
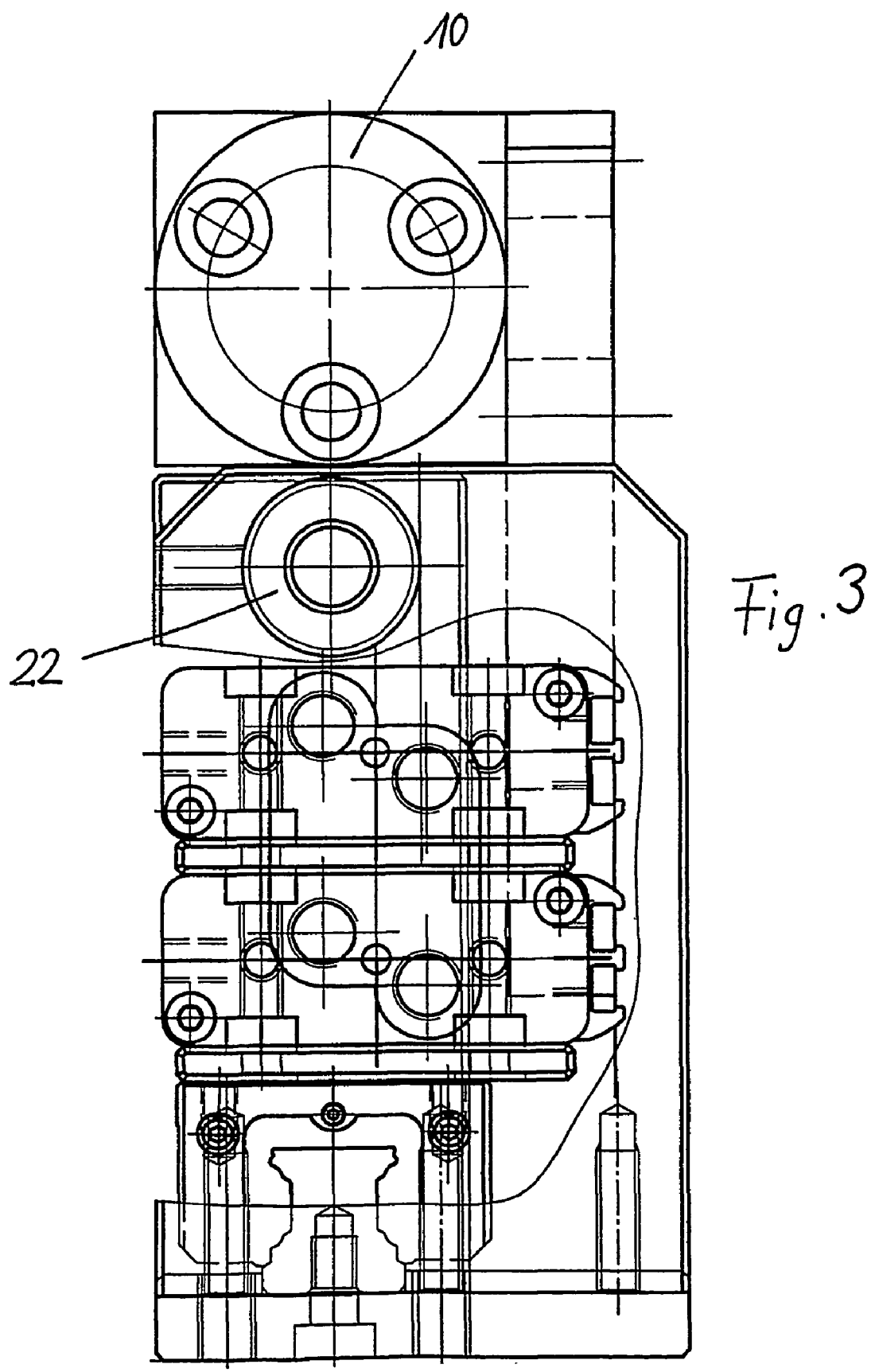
FIG. 3 a top view of the apparatus according to FIG. 1.

FIG. 1 shows an embodiment of an apparatus according to the invention in the basic position in cross-section. The apparatus according to the invention comprises a riveting module 10 having a rivet placing head 12 for placing blind rivet nuts. The riveting module 10 by means of a slide 14 is mounted vertically displaceable on a basic frame 16. The slide 14 is moved upwardly and downwardly by means of the two pneumatic cylinders 18, 20. Between the riveting module 10 and the out-most pneumatic cylinder 18 there is positioned a rigid, straight, long tube 22, the interior diameter of which is slidely larger than the exterior diameter of the blind rivet nuts. This tube 22 is serving as a rivet feed, wherein the blind rivet nuts are blown by means of pressurized air into the feed tube 22 from an usual separating apparatus via a usual rivet feed.

In the basic position shown in FIG. 1 exactly below the feed tube 22 there is a cup 24 suitable for receiving the corresponding blind rivet nuts. The cup 24 by means of two screws is fixed to a further slide 30 which is horizontally displaceable by means of a pneumatic cylinder not shown. The cup 24 is provided with a clamping cylinder by the means of which the blind rivet nuts are held during the screwing up onto the rivet placing head 12.

In the following, the working procedure of the apparatus according to the invention shown in FIG. 1 is described in detail.

As already mentioned, FIG. 1 is showing the basic position of the apparatus according to the invention at the start of the work. The cup 24 here is positioned exactly below the feed tube 22 such that now the first blind rivet nut to be set can be fed via the tube 22 and can be deposited in the cup 24. By actuating the pneumatic cylinder 20 now the pneumatic cylinder 18, the slide 14 fixed thereto and the riveting module 10 are lifted by a certain distance.

The slide 30 now is moved outwardly such that the cup 24 is exactly centered below the rivet placing head 12. In this state, the blind rivet nut in the cup 24 is fixedly held by the clamping cylinder.

The pneumatic cylinder 20 now is retracted again, whereby the riveting module 10 is lowered onto the blind rivet nut in the cup 24 fixed by the clamping cylinder. The riveting module 10 now begins with the screwing up of the nut. As soon as this procedure is finished, the clamping cylinder in the cup 24 is opened, the riveting module 10 is displaced again upwardly such that the slide 30 with the cup 24, which is empty now, can be moved again inwardly below the rivet feeding tube 24. As soon as the slide 30 has been moved "out of way" in this way the riveting module, which is now carrying the blind rivet nut to be placed on its riveting head 12, can be moved into the placing position by retracting the pneumatic cylinder 20 and extending the pneumatic cylinder 18 moving the riveting module 10 completely downwardly and extending far over the lower edge of the slide 30. The blind rivet nut now can be placed. After the placing of the blind rivet nut, the pneumatic cylinder 18 is retracted again and the apparatus thereby achieves the basic position according to FIG. 1 again and the next working cycle can begin again. As soon as the cup 24 on the slide 30 has been moved back below the rivet feed tube 22, the next blind rivet nut can be fed and can be placed in the cup 24 and held again by the clamping cylinder.

The main advantage of the present invention is residing in the fact that the apparatus according to the invention can be made in a smaller size compared with the devices according to the prior art, wherein still a length of the stroke is possible being three-times larger. According to the invention, the entire mechanic in the driving technique can be constructed by standard pneumatic cylinders. Thereby a shorter delivery time for spare parts and smaller costs of the store-keeping of spare parts is achieved. Further, the apparatus according to the invention can be reset substantially more easily to blind rivet nuts having a different diameter. To this end, namely, merely two feeding parts have to be exchanged, i.e. the receiving cup 24 and the feed tube 22. To enable an especially fast exchange of these parts according to the invention it is sufficient if the receiving cup 24 is fixed to the apparatus by means of two screws and the feed tube 22 by means of one clamping screw. The time for resetting thereby is reduced to a minimum.

| LIST OF REFERENCE NUMERALS | |
|---|---|
| 10 | Riveting Module |
| 12 | Rivet Placing Head |
| 14 | Slide |
| 16 | Basic Frame |
| 18 | Pneumatic Cylinder |
| 20 | Pneumatic Cylinder |
| 22 | Feed Tube |
| 24 | Cup |

The invention claimed is:

1. An apparatus comprising: a rivet module; means for moving the rivet module from a rivet loading position to a rivet placing position; a cup; and a rivet feed, said cup configured to laterally displace between a position under the rivet feed and a position under, and external to, the rivet module when the rivet module is in the rivet loading position, said cup configured to selectively clamp and unclamp a rivet, wherein the apparatus is configured such that the cup is configured to receive a rivet from the rivet feed, clamp the rivet, and move to a position under, and external to, the rivet module, when the rivet module is in the rivet loading position, wherein the rivet module is configured to be lowered onto the rivet in the cup and engage the rivet while the rivet is clamped in the cup, wherein said cup is configured to thereafter unclamp the rivet, wherein said means is configured to move said rivet module upwardly away from the cup and said cup is configured to move from under the rivet module, and the means is configured to thereafter move the rivet module to the rivet placing position for subsequently placing the rivet.

2. The apparatus according to claim 1, characterized in that the rivet feed is a long, straight, vertically extending tube.

3. The apparatus according to claim 1 or 2, further comprising motive means in the form of pneumatic cylinders.

4. The apparatus according to claim 3, characterized in that the cup is fixed to a slide driven by a pneumatic cylinder by means of only two screws.

5. The apparatus according to claim 1 or 2, characterized in that the cup is fixed to a slide driven by a pneumatic cylinder by means of only two screws.

6. The apparatus according to claim 1, wherein the clamping cup includes a cylinder configured to fixedly hold a blind rivet nut.

7. A method for loading a riveting module, comprising providing an apparatus which comprises a rivet module, means for moving the rivet module from a rivet loading position to a rivet placing position, a cup, and a rivet feed, said cup configured to laterally displace between a position under the rivet feed and a position under, and external to, the rivet module when the rivet module is in the rivet loading position, said cup configured to selectively clamp and unclamp a rivet, said method further comprising having the cup receive a rivet from the rivet feed, having the cup clamp the rivet, moving the cup to a position under, and external to, the rivet module, when the rivet module is in the rivet loading position, lowering the rivet module onto the rivet in the cup so as to engage the rivet when the rivet is clamped in the cup, having the cup thereafter unclamp the rivet, moving the rivet module upwardly away from the cup, moving the cup from under the rivet module, and thereafter moving the rivet module to the rivet placing position for subsequently placing the rivet.

8. The method according to claim 7, characterized in that the rivet is oriented by suitable abutment pieces on a clamping cylinder in the cup and thereby can be fed to the rivet module in the correct position.

* * * * *